United States Patent
Jambhekar et al.

(10) Patent No.: US 6,973,318 B2
(45) Date of Patent: Dec. 6, 2005

(54) APPARATUS AND METHOD FOR DOWNLOADING JOURNEY-RELATED INFORMATION

(75) Inventors: Shrirang Nilkanth Jambhekar, Palatine, IL (US); Leslie Gabor Seymour, Barrington, IL (US); David Wheatley, N. Barrington, IL (US); William F. Zancho, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 566 days.

(21) Appl. No.: 09/994,318

(22) Filed: Nov. 26, 2001

(65) Prior Publication Data

US 2004/0203840 A1    Oct. 14, 2004

(51) Int. Cl.$^7$ ............................ H04Q 7/20; G08G 1/123
(52) U.S. Cl. ............................ 455/456.1; 455/404.2; 455/414.1; 455/414.3; 455/422.1; 455/456.3; 455/457; 340/995.12; 340/995.17; 340/995.24
(58) Field of Search .................. 455/456.1, 456.6, 455/433, 414, 418–420, 404.2, 414.1, 414.3, 455/422.1, 456.3, 457; 340/995.12, 995.17, 340/995.24

(56) References Cited

U.S. PATENT DOCUMENTS

| | | | |
|---|---|---|---|
| 4,796,191 A | | 1/1989 | Honey et al. |
| 4,882,696 A | | 11/1989 | Nimura et al. |
| 5,046,011 A | | 9/1991 | Kakihara et al. |
| 5,959,577 A | * | 9/1999 | Fan et al. ............... 342/357.13 |
| 6,091,956 A | * | 7/2000 | Hollenberg ............... 455/456.5 |
| 6,101,387 A | * | 8/2000 | Granberg et al. ............ 455/433 |
| 6,198,930 B1 | * | 3/2001 | Schipper ...................... 455/440 |
| 6,308,060 B2 | | 10/2001 | Wortham |
| 6,347,278 B2 | | 2/2002 | Ito |
| 6,385,454 B1 | * | 5/2002 | Bahl et al. ................... 455/450 |
| 6,438,488 B2 | | 8/2002 | Lee |
| 6,446,004 B1 | * | 9/2002 | Cao et al. ..................... 701/213 |
| 6,522,875 B1 | * | 2/2003 | Dowling et al. .......... 455/414.3 |
| 6,525,768 B2 | * | 2/2003 | Obradovich ........... 348/231.99 |
| 6,583,734 B2 | * | 6/2003 | Bates et al. ................. 340/988 |
| 6,594,505 B1 | * | 7/2003 | Ishii ......................... 455/552.1 |
| 6,680,919 B1 | * | 1/2004 | Rauhala ...................... 370/310 |
| 6,798,358 B2 | * | 9/2004 | Joyce et al. ........... 340/995.24 |
| 2002/0049065 A1 | * | 4/2002 | Wallenius ................... 455/461 |
| 2002/0055878 A1 | * | 5/2002 | Burton et al. ................. 705/26 |
| 2002/0123336 A1 | * | 9/2002 | Kamada ..................... 455/420 |
| 2002/0152115 A1 | * | 10/2002 | Morita et al. ................. 705/13 |
| 2003/0191578 A1 | * | 10/2003 | Paulauskas et al. ......... 701/200 |
| 2003/0191583 A1 | * | 10/2003 | Uhlmann et al. ........... 701/208 |
| 2003/0208595 A1 | * | 11/2003 | Gouge et al. ............... 709/225 |

OTHER PUBLICATIONS

S. Ashley, "Driving The Info Highway," www.sciam.com, Scientfic American, Oct., 2001, pp. 52-58.

* cited by examiner

*Primary Examiner*—Lester G. Kincaid
*Assistant Examiner*—Huy Phan (57) ABSTRACT

Vehicles (106) are equipped with two-way communication units (401) that communicate with roadside (114) and vehicular mounted two-way communication units to receive and/or exchange journey-related information. When approaching a geographic zone that does not support such services, a given vehicle (106) can receive at least a partial download of journey-related information concerning the second geographic zone (102) while still proximal to the entry border (107) for that zone (102). The download can be implemented wirelessly, through hard physical contact, or both. The download may also be at least partially concluded while traveling within the second geographic zone (102) through use of a second non-compatible wireless service such as wireless telephony.

71 Claims, 4 Drawing Sheets

APPARATUS AND METHOD FOR DOWNLOADING JOURNEY-RELATED INFORMATION

TECHNICAL FIELD

This invention relates generally to wireless communications and particularly to wireless communications carrying information to facilitate a journey.

BACKGROUND OF THE INVENTION

Wireless communications are known. Wireless systems making use of frequency reuse, such as cellular systems, are virtually ubiquitous and dispatch services are also well integrated and dispersed. Both are key components of modern infrastructure.

Now, at least one group seeks to define a new wireless communications service to specifically facilitate terrestrial-based vehicular journeys (particularly for automobiles and trucks). Presently known as dedicated short range communications (DSRC), the Federal Communications Commission in the United States has presently at least tentatively identified spectrum that can be used for such journey-related information. The American Society for Testing and Materials presently acts as a standards development group to define such a communications service to support provision of journey-related information to vehicular users. At present, the over-the-air interface has not been defined (though at least two wireless local area network systems—the I.E.E.E.#802.11A and Motorola's control channel based Freespace system—have been proposed and are being considered). This group has, however, made considerable progress towards defining the services that the service will support. In particular, such a journey-related information provision system should ultimately provide roadside information and corresponding vehicle-to-vehicle communications to support both public safety and private requirements (depending upon the application transmission range will likely vary from fifteen meters to three hundred meters).

As an example of public safety services, such a roadside information system can be expected to support:

Traffic count (for example, determining the number of vehicles that traverse an intersection over a given period of time);
Traffic movement information;
Toll collection;
In-vehicle signage (for example, presenting □stop□ information within the cockpit of a vehicle as the vehicle approaches a stop sign);
Road condition warnings;
Intersection collision avoidance (including highway/rail intersections);
Vehicle-to-vehicle information (for example, stopped vehicle or slowing vehicle information);
Rollover warnings;
Low bridge warnings;
Border clearance facilitation;
On-board safety data transfer;
Driver's daily log;
Vehicle safety inspection information; and
Emergency vehicle traffic signal preemption. Examples of private requirements include;
Premises access control;
Gasoline payment;
Drive-through retail payment;
Parking lot payments;
Various vehicular related data transfers (for example, diagnostic data, repair service record data, vehicular computer program updates, map information, and user content such as music);
Rental car processing;
Fleet management;
Locomotive fuel monitoring; and
Locomotive data transfer.

As such communications systems that serve to support provision of journey-related information to a user (where the □user□ may be a driver or passenger of a vehicle and/or the vehicle itself) are constructed and placed in service, coverage will likely not be universal. Certainly at the outset coverage cannot likely be complete. Consequently travelers will journey in and out of geographic zones that do not support the service. These zones may be small or large and these zones may represent temporary or ongoing conditions. As users come to rely upon such services for safety, convenience, comfort, and control, however, encountering such geographic zones during a journey may pose troubling and even dangerous circumstances for the user.

A need therefor exists for a way to detect the present and/or future likelihood that such services are not or will not be available within a particular geographic area.

A need therefor exists far away to alert a user when such services are not presently and/or imminently available to a given user.

A need therefor exists for a way to substitute, at least to some degree, for the services that are missing in such a geographic zone.

DETAILED DESCRIPTION OF THE PREFERRED EMBODIMENTS

Pursuant to the embodiments disclosed herein, the applicants have provided both apparatus and method to facilitate a vehicular-based user in a first geographic zone which first geographic zone has a communications service that supports provision of journey-related information determining that the user is at least likely to leave the first geographic zone and enter a second geographic zone that does not have the communications service. Upon making this determination, the user can download at least some journey-related information regarding the second geographic zone while the user is at least proximal to an entrance boundary for the second geographic zone.

So configured, a user can obtain at least some journey-related information that may be of benefit while traveling through the second geographic zone. For example, signage information can be downloaded to the user and used in conjunction with an on-board navigation system to provide similar in-vehicle signage notices as anticipated by currently envisioned DSRC services notwithstanding the absence of actual DSRC services in the second geographic zone. Downloading at least part of this information while at least proximal to the entrance boundary (and hence proximal to the place where the information may actually be needed) serves to potentially minimize unnecessary transmission of data that may not actually be necessary and also potentially places fewer demands upon data storage capacity available to the user.

These attributes and benefits and many more will become more evident upon making a thorough review and study of the following detailed description and the accompanying figures.

Figure 1:
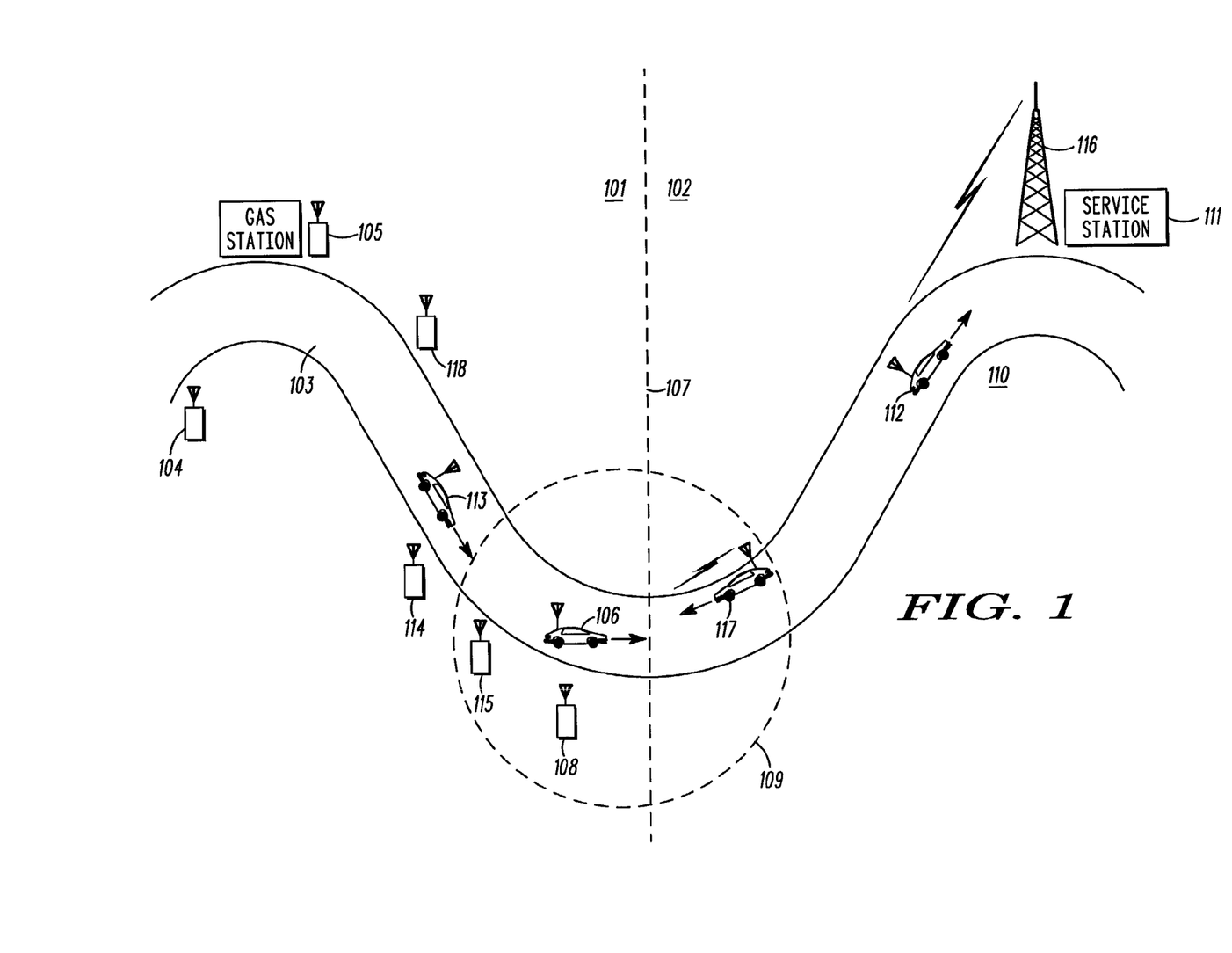
FIG. 1 illustrates two geographic zones having a roadway passing through both.

Referring now to FIG. 1, a first geographic zone 101 and a second geographic zone 102 are depicted. These two geographic zones 101 and 102, for purposes of this example, abut one-another at a shared boundary 107. A vehicular roadway 103 passes through at least portions of both geographic zones 101 and 102.

The first geographic zone 101 has a communications service such as DSRC supported therein. This communications service supports provisions of journey-related information to users, and particularly to users comprising drivers, passengers, and/or terrestrial-based vehicles such as automobiles and trucks (though not depicted, railroad trains and other terrestrial vehicles can benefit from such systems as well). Consequently, vehicle 106 traveling along the roadway 103 in the first geographic zone 101 will have benefit of various transmissions of safety and convenience-related information. For example, a first communications service transmitter 104 can be positioned to signal that a sharp curve in the roadway 103 lies just ahead. The user 106 can receive this information and have that information provided in a variety of ways to the driver and/or other on-board systems. Service stations located along the roadway 103 can sponsor such communications service transmitters 105 to allow information to be wirelessly provided to the user 106 related to products and services available at that service station. Another communications service transmitter 118 can be positioned to provide pertinent information to the user 106 regarding a construction zone to thereby allow the user to take appropriate cautionary action. (These three examples are exemplary only. Any and all currently envisioned and later considered journey-related information, such as those applications currently proposed for DSRC systems, may be considered supported as being as appropriate throughout the first geographic zone 101.)

By contrast, the second geographic zone 102 does not support this communications service. Consequently, a user traveling the roadway 103 through the second geographic zone 102 will not receive any (or significantly reduced) wireless information via the communications service as described above notwithstanding the availability of user end equipment compatible with that service. The second geographic zone 102 may be small or large. In either case, unavailability of such information may pose both inconvenience and hazard to a user traversing the second geographic zone 102.

Pursuant to one embodiment, another communications service transmitter 108 exists, at least in part, to communicate with a user 106 who is about to enter, or has just recently entered the second geographic zone 102 from the first geographic zone 101. Pursuant to this communication, the communications service can at least partially download, while the user remains at least proximal to an entrance boundary 107 for the second geographic zone 102, at least some journey-related information regarding the second geographic zone 102. This transmitter 108 can provide such information to the user 106 so long as the user 106 remains within the coverage area 109 of the transmitter 108. So long as the data to be transmitted remains fairly compact (through, for example, compression and/or limited data in the first instance) the download may be completed while the user 106 travels in an ordinary fashion along the roadway 103. If a complete download of desired information cannot be accommodated within the coverage area 109 of this transmitter 108, alternative ways of providing complete information to the user 106 can be used such as those set forth below.

With appropriate journey-related information so downloaded, a user 112 traveling along the roadway 103 in the second geographic zone 102 can have benefit of at least this information, and this information can be used in a way to mimic to some extent the way in which the user will ordinarily receive and use roadside information while traveling in the first geographic zone via the communication service. For example, when the downloaded information includes signage content information and when the user also has an onboard navigation system, when the user 112 approaches a sharp curve 110 a □sharp curve□ signage display can be provided within the vehicle in exactly the same way as when such information is received in real time through the communications service when traveling in the first geographic zone 101. (Although alternative ways of using the information and presenting the information to a user can be utilized, in general, the preferred embodiment tends towards working to provide the substitute information to the user in a way that looks and feels as though non-substitute information was being received and used. When accomplishing this, the user platform 400 can either receive and process the substitute information in an alternative way in comparison to how the platform 400 ordinarily receives and processes non-substitute information, or the substitute information can be provided to that part of the user platform 400 that ordinarily processes non-substitute information such that, for all intents and purposes, the user platform 400 functions as though it is receiving non-substitute information. These and other approaches can be selected to suit a particular application.)

Such downloaded information does not represent a complete panacea, of course. Downloading such information may require greater memory capacity than would otherwise be required to support operation with the communications service. Furthermore, such information can become outdated. Unlike the real time information usually provided by the communication service, this pre-stored information will not ordinarily be readily updatable without other action and effort being required. Some aspects of an embodiment taught below at least partially address this concern.

Other aspects depicted in FIG. 1 will be described in detail below when relevant to subsequent descriptions.

Figure 2:
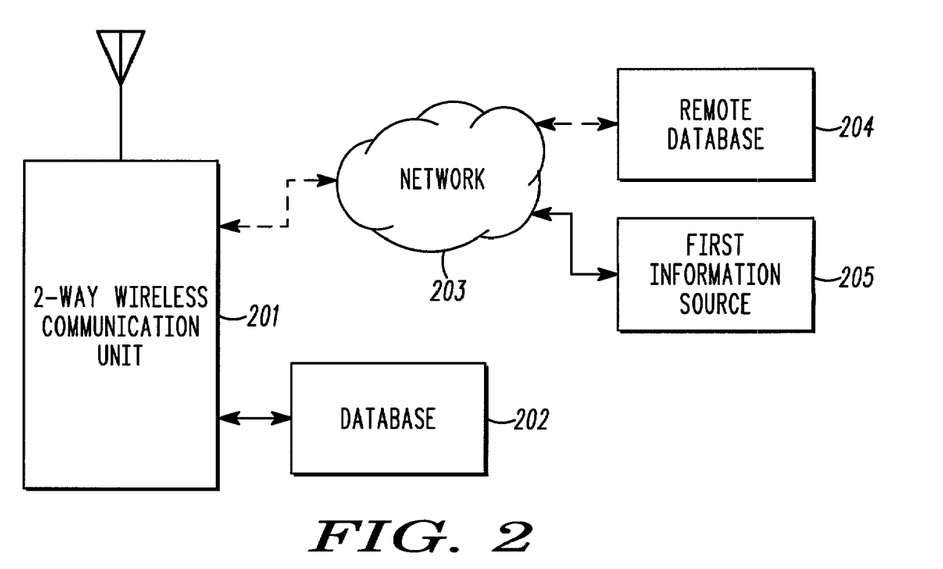
FIG. 2 illustrates a block diagram depiction of an embodiment for fixed end equipment.

FIG. 2 depicts fixed end equipment as used in the communications service (□fixed end equipment□ does not require that the equipment be permanently installed; indeed, many applications envision some degree of portability, such as construction zone barriers that are temporarily set up for hours, days, or weeks at a time). The fixed end equipment includes a two-way wireless communications unit 201 that communicates compatibly using the communications service. The two-way wireless communications unit 201 couples to a database 202 that includes at least some journey-related information regarding the second geographic zone. As disclosed below in more detail, this database 202 can be updated in a variety of ways and provided in whole or in part to a given user on a static or dynamic basis. The two-way wireless communications unit 201 can optionally couple to a network 203 such as an intranet or an Internet. This coupling can be through a land-line or through a wireless connection or both. Via the network 203, the two-way wireless communications unit 201 can couple to information sources such as a first information source 205 providing weather information (either in a repeating broadcast mode or responsive to specific queries) and optionally to a remote database 204. This remote database 204, as disclosed below in more detail, can harbor additional information useful to facilitating a download of pertinent journey-related information to a given user.

Figure 3:
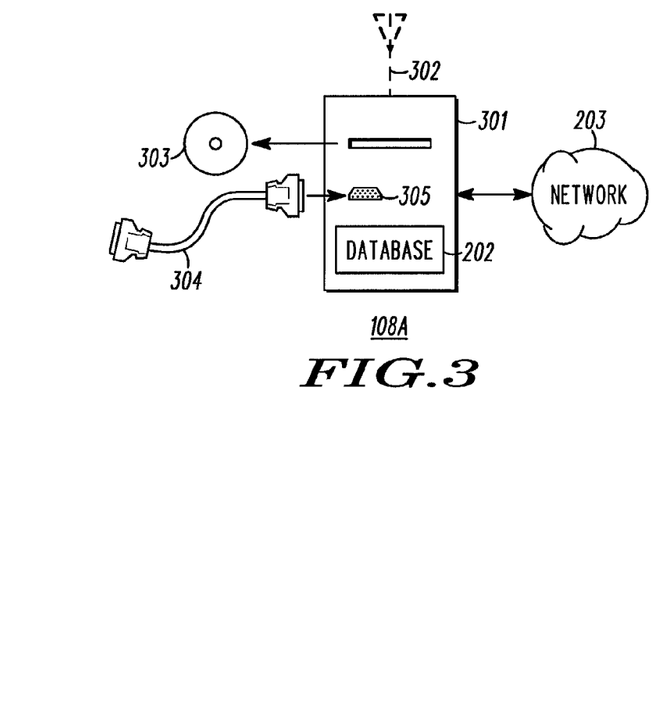
FIG. 3 comprises another embodiment of fixed end equipment.

Referring to FIG. 3, an alternative platform for providing a download of journey-related information to a user may comprise instead a kiosk 301 or other housing. The kiosk 301 can again include a database 202 and have connections to a network 203 as described above. In this embodiment, however, although the kiosk 301 may or may not include wireless transmission capability 302 (partial wireless connectivity may be appropriate to facilitate at least initial transactional communications with a given user), the kiosk 301 further serves to facilitate a physical transfer of data to the user. For example, the kiosk 301 can provide a portable memory device such as an optically encoded memory device 303 or an electromagnetically encoded memory device (not depicted) for use by the user. In combination with providing such a portable memory device, or in the alternative, the kiosk 301 can have an appropriate data portal 305 such that a data conduit 304 (such as an electrical signal conduit or an optical signal conduit) can be coupled between the data port 305 and the user's platform to facilitate downloading of the journey-related information regarding the second geographic zone 102 to the user.

So configured, the kiosk 301 constitutes a dispensing station that dispenses the journey-related information to the user via partial or completely non-wireless mechanisms. With this dispensing station configuration, a user can stop and obtain the desired journey-related information without concern for wireless bandwidth considerations or coverage area limitations. A dispensing station approach may be particularly viable when offering journey-related information as pertains to a particularly large unsupported geographic zone as the necessary information may be highly voluminous in that event.

Figure 4:
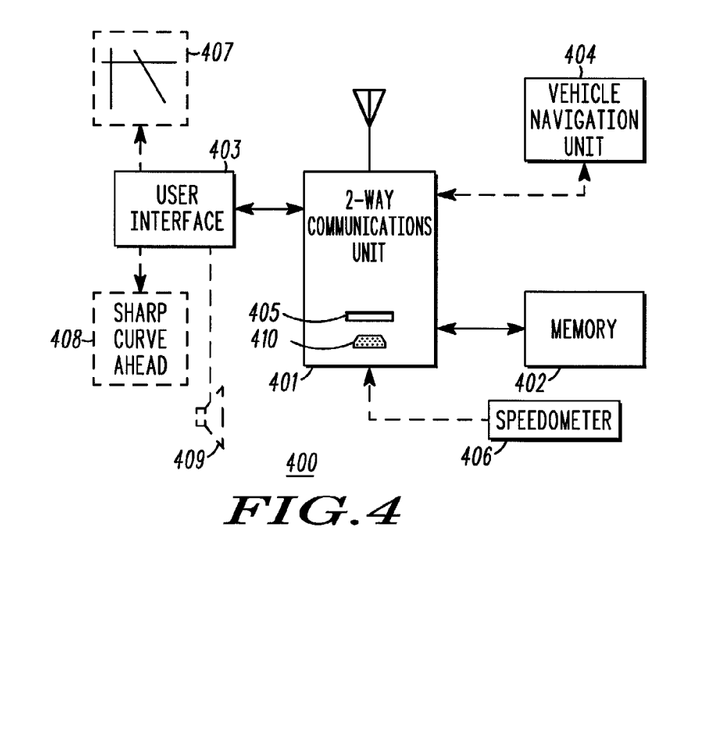
FIG. 4 comprises a block diagram depiction of vehicle mounted user equipment.

Referring to FIG. 4, the user vehicle has a two-way communications unit 401 disposed therein. The two-way communications unit 401 should of course be compatible with the communications service to facilitate transmission and reception of appropriate system compatible messages and data payloads and should include sufficient processing capability to support the DSRC services and other activities taught herein. The two-way communications unit 401 couples to an appropriate memory 402 to store, at a minimum, journey-related information as downloaded pursuant to the embodiments described herein. The two-way communications unit 401 also couples to a user interface 403 to allow for provision of journey-related information as gleaned via the communications service. That user interface 403 may couple to or be a part of other user interfaces for the vehicle itself. Optionally, the user interface 403 can couple to and/or drive a visual graphic display 407 that can depict both graphics such as maps and icons as well as text. The user interface 403 can also optionally couple to a text-only display 408 and/or an audio transducer 409 to provide for signaling noises or other audio content such as voice massaging. The two-way communications unit 401 can also couple to a vehicle navigation unit 404 (such as a global positioning satellite system unit and/or a dead reckoning-based system as well understood in the art) to the extent the vehicle has such a unit. Furthermore, the two-way communications unit 401 can couple to other sensors on the vehicle, such as for example a speedometer 406, external temperature sensor, light detector, automotive radar, and the like.

So configured, the two-way communications unit 401 can receive journey-related information from communications service transmitters in the first geographic zone 101 and provide that information in appropriate ways to the user (in addition or in the alternative, such information can be provided directly to onboard vehicular systems). When traveling into the second geographic zone 102, appropriate journey-related information can also be downloaded and stored in the memory 402. (In addition or in the alternative, the two-way communications unit 401 can have a portable memory device interface 405 such as a CD-ROM reader and/or a data portal 410 to facilitate coupling to a data conduit 304 as mentioned above with respect to FIG. 3). The downloaded information can then be used alone or in conjunction with other information (such as location information and destination information from the vehicle navigation unit 404 and/or input from various vehicle sensors 406) to facilitate the user's journey through the second geographic zone 102 by provision of communications service-like information to the user via the user interface 403.

As described so far, the first geographic zone 101 has a plurality of fixed equipment units that can provide a wide variety of real time journey-related information to a traveling user along with at least one unit that can provide information to a user regarding an adjacent geographic zone 102 that does not have the service in question. Furthermore, the user has appropriate vehicle-mounted equipment to receive and use such real time journey-related information while traveling in the first geographic zone 101 and to receive journey-related information pertinent to the second geographic zone 102 and use that downloaded information while traveling through the geographic zone 102.

Figure 5:
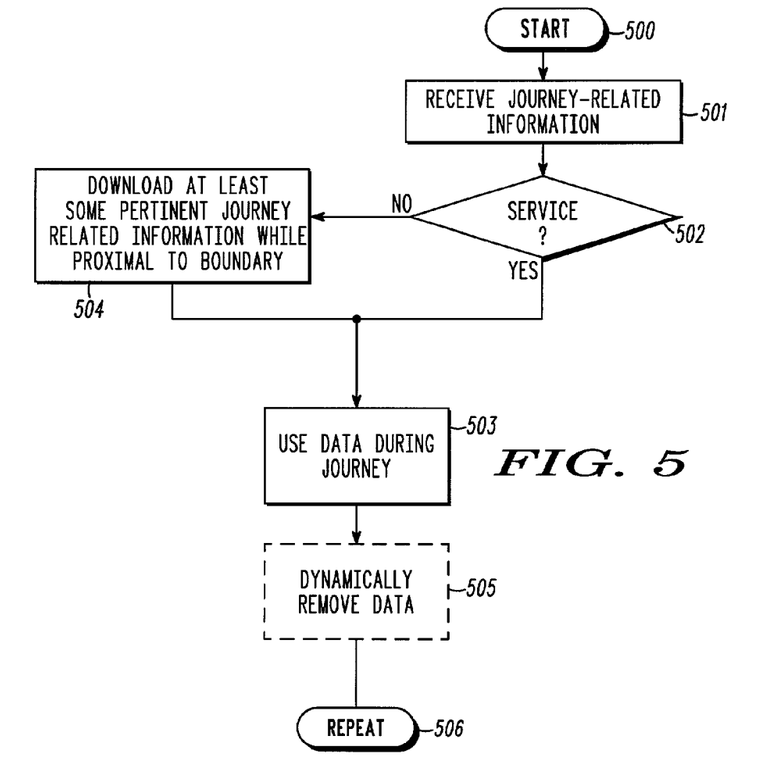
FIG. 5 illustrates a flow diagram in accordance with the invention.

Referring now to FIG. 5, a method for facilitating the above-described actions and to make use of the described equipment will now be provided.

At the outset 500, this process will presume the example of a user traveling along the roadway 103 as described earlier in FIG. 1. As this user traverses the roadway 103 through the first geographic zone 101, the user will receive 501 journey-related information as transmitted from time to time by various transmitters in the first geographic zone 101 to provide local and/or current information regarding the roadway 103, local services, and other factors that can impact upon the journey of the user (such as weather, accidents, and so forth). From time to time, the user's platform (400 as described above with respect to FIG. 4) will determine 502 if the user is at least likely to enter a geographic zone that does not have the communications service. location, which location is somewhat proximal the border 107 of the second geographic zone #102. This passage can be detected in various ways, including by reception of a marker beacon transmitted by a communications service transmitter 114 that either serves this purpose specifically or in addition to facilitating communication of other journey-related information.

In another embodiment, this determination 502 can be based upon passing at least two predetermined geographic locations represented in FIG. 1 by two consecutive transmitters 114 and 115. Providing two or more such events has a particular benefit in that it eases determining whether the user 113 is presently approaching or withdrawing from the border 107. In yet another approach, the determination 502 can be based upon detecting that the user 113 has previously passed at least one predetermined geographic location (such as that represented by the first beacon transmitter 114 mentioned above) within a predetermined period of time.

In yet another embodiment, the determination 502 can detect that the user 113 has passed at least one predetermined geographic location by automatically accessing a navigation unit (such as the vehicle navigation device 404 described in FIG. 4) as used by the user. With access to a navigation device, the user 113 can ascertain with considerable precision a present location of the vehicle. This knowledge of present location can be combined with either prior or currently obtained information regarding the location of the border 107 to make the determination 502 as to whether the user is presently likely to cross the border 107 into an unsupported zone. (Such information regarding the location of the border 107 could have been previously obtained in a variety of ways. For example, the information could be contained in data that represents the predetermined route the vehicle is following where the border is marked as a special attribute that is assigned to a location that connects adjacent legs of the predetermined route. In situations where no predetermined route data is available for whatever reason, the digitized road-map data might store the information in other forms: as special attributes assigned to road-segments along the borderline; as a border-point attribute that is assigned to nodes that link adjacent road-segments when the borderline crossing is in the proximity of such a node (this approach is probably most feasible for situations where the borderline crosses road-lines); as a separate and distinct designated point of interest; as a virtual street address record (for example, a specified distance from a last intersection or other node of designated point of interest); and treating the borderline segments as virtual linked road segments to thereby identify the intersection of the road and the borderline.

When the determination 502 concludes that the user does not appear to be presently likely to enter a region lacking the communications service, the user simply continues using 503 data as received from first communications service transmitters during the course of traveling through the first geographic zone 101. These steps are then repeated 506 from time to time as the user repeatedly receives journey-related information, makes occasional determinations 502 regarding the likelihood of the user leaving the area that supports the communications services, and using 503 the journey-related information as received in ordinary course.

When the determination 502 concludes, however, that the user is at least likely to enter a second geographic zone 102 that does not support the communications service, the user effects a downloading 504 of at least some pertinent journey-related information while the user remains proximal to the boundary 107 between the two geographic zones 101 and 102. Upon obtaining the downloaded journey-related information, the process then uses 503 that downloaded data, along with such other information as it may have available and as referenced in more detail below to continue to facilitate the user's journey through the second geographic zone 102.

The downloaded data may comprise a significant quantity of data and hence may utilize a significant amount of resident memory (402 in FIG. 4). Because of this, and because it may be desirable to lessen such demands upon the memory 402, the user's platform 400 can optionally dynamically remove 505 data from the memory 402 during the course of traveling through the second geographic zone 102. Pursuant to one embodiment, as the user travels through the second geographic zone 102, the user's platform 400 can automatically remove portions of the downloaded journey-related information as regards aspects of the second geographic zone 102 that correspond to geographic locations that the user has at least reached or, if desired, passed by some predetermined distance or time. Pursuant to this approach, information that the user will not likely again need can be dispensed with to free up available memory.

Pursuant to another approach, when downloading the journey-related information regarding the second geographic zone in the first instance, at least some of the journey-related information can include a corresponding expiration time. Then, when moving through the second geographic zone 102, the user platform 400 can automatically remove portions of the journey-related information as regards the second geographic zone for which the expiration time has been met. In this way, information that likely will lose validity over time can be purged from the system regardless of whether the user has yet obtained a position that corresponds with the journey-information in question. For example, weather forecast information can be purged following some point in time when accuracy of the forecast can be considered unduly doubtful. As another example, other information may have a known time of expiration, such as construction zone information.

The downloading step 504 mentioned above can comprise a number of individual steps, which steps themselves are subject to a variety of alternatives and modifications. The step of downloading 504 will therefor be described in more detail with reference to FIG. 6.

Figure 6:
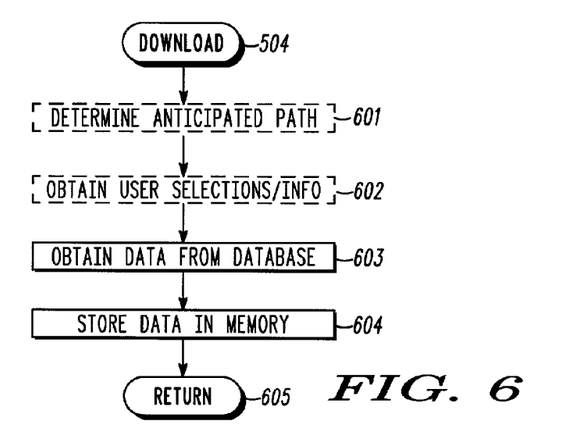
FIG. 6 illustrates a flow diagram depicting additional details pertinent to FIG. 5.

Referring now to FIG. 6, the downloading 504 can first optionally begin with determining 601 an anticipated path for the user through the second geographic zone 102. By making such a determination, the journey-related information selected for this particular user can be directed more towards information relevant to that particular path and thereby save downloading time and memory requirements. To make this determination 601, the process can access destination point information as provided by the user, or by estimating an anticipated journey path by referencing historical information regarding the user's travels or by any other appropriate means. Such information can be provided by the user at the time of requesting or authorizing the download. The user can be prompted in real time to provided an identification of the anticipated journey path, or previously stored identifying information (such as was perhaps provided to the vehicle's navigation unit 404 at an earlier time). The historical information regarding the user's travels can be obtained, for example, from the vehicle navigation unit 404 if that unit 404 regularly or optionally stores such data.

Following this determination 601, the process can then optionally obtain 602 specific selections and information that pertain to this particular user. These selections can either be static or dynamic in nature. And again, one reason for identifying such information is to avoid downloading all available journey-information regarding the second geographic zone 102. By utilizing specific criteria as provided by the user, potentially limited memory and/or downloading capacity can be tailored to maximum benefit of the user. (Conversely, where such limitations do not apply or can be disregarded, a full download of all journey-related information regarding the second geographic zone as is contained in the database 202 can be downloaded to the user platform.)

The user selections can be provided at the time the user facilitates the downloading process. In an alternative embodiment, the process can utilize previously stored preferences that are at least partially specific to this particular user. Such previously stored preferences can be directly received from the user provided such information was previously stored in a manner that is accessible to the user's platform 400. Alternatively, the previously stored preferences can be stored in a database that is remote from the user. For example, with momentary reference to FIG. 2, the remote database 204 may represent a personal or public repository where a user can store such preferences for subsequent access and use by an inquiring two-way wireless communications unit (201 of FIG. 2) as per this process.

As another alternative, the previously stored preferences can be obtained in part from the user at the time of seeking to facilitate the downloading and in part from a remote database. This approach may be appropriate when there are a significant number of preferences or where the information, for whatever reason, presents significant bulk. In such a case, placing as much of this information into the remote database 204 (which presumably can be provided to the two-way wireless communications unit 201 when working this process 504 in a relatively rapid fashion) and leaving only present-time critical preferences for the real time exchange between the user and the process-facilitating system element can constitute an appropriate compromise.

Other kinds of information may also be uploaded at this time to the communications service, including an intended destination for the user, an estimated or actual time by when the user enters the second geographic zone 102, an intended travel route for the user, and a wireless telephonic contact number for the user to name a few. Such information could be used in various ways to benefit the convenience and safety of the user.

Following this optional step 602, the process obtains 603 data from one or more databases. As mentioned earlier, this downloading can include all, or only part, of all journey-related information regarding the second geographic zone 102 as is contained in the one or more databases. Various items of journey-related information can be downloaded, including for example, weather forecast information for at least a part of the second geographic zone, and particularly weather forecast information that corresponds to an anticipated journey path for the user.

Pursuant to one embodiment, the downloading will occur, at least in part, by wirelessly transmitting the journey-related information to the user. In some instances, the complete payload of journey-related information intended for the user can be provided while the user remains within the coverage area (109 in FIG. 1) of the transmitting unit (108 in FIG. 1). In some instances, however, it may not be feasible to download the entire intended payload. Pursuant to one embodiment, at least some remaining journey-related information regarding the second geographic zone is broadcast to the user while the user is within the second geographic zone but distal to the entrance boundary 107 of the second geographic zone 102. To facilitate the latter, an alternative communications service such as, for example, a cellular telephony system (116 in FIG. 1) can be used. For example, the initial transmission and downloading as occurs while proximal to the border 107 can include specific contact information whereby the user's platform 400 can later dial (automatically or with the assistance of the driver or passenger) to contact a communications service representative platform via the alternative wireless service in the second geographic zone 102 in order to complete the downloading transaction (or to at least complete a portion of the remaining transmission).

For a variety of reasons, at least some of which were mentioned earlier in conjunction with FIG. 3, it may be desirable to affect at least part of the download through other than wireless means. As noted earlier, a physical interconnection can be used. This physical interconnection can either utilize a portable memory device such as an optically encoded memory device or an electromagnetically encoded memory device (both as potentially distributed from an appropriate dispensing station as taught above) or through use of an appropriate data conduit such as an optical conduit or an electrical signal conduit. Through this facility, potentially voluminous quantities of data can be provided to the user for use when traveling in the second geographic zone 102 without requiring wireless transmissions that may be inadequate to support that volume of data without significant inconvenience or cost to the user.

In one optional embodiment, the user can provide user-based downloading criteria. This criteria can then be used to dynamically configure or otherwise conduct the download, either with respect to its contents or its manner of transmission. For example, the user-based downloading criteria may include encryption information including an encryption key (this option may be appropriate where increased security regarding the user's journey is merited). Other criteria may specify data formats or data compression information including specific types of data compression to be utilized. Other criteria can specify data presentation requirements, including when data can be provided in more than one form, that the data at least include a visual display of information (such as textual or graphic display of information), and/or data that will facilitate audible conveyance of that information (such as reconstructed speech or signal sounds). As yet another example of user specified criteria, the user-based downloading criteria can include information such as the user platforms processing speed, available memory, and/or vehicle speed such that the communications service transmitter 108 can compress the download information as a function, at least in part, of such criteria.

The journey-related information as stored in the database 202 and downloaded to the user can represent data obtained from a number of sources, some of which have been mentioned above. One source particularly appropriate to the context of these embodiments includes data regarding the second geographic zone 102 as obtained from a different user who has come through the second geographic zone 102 and has uploaded to the communications service (either to the system as a whole or to the specific transmitter with which the present user is negotiating) information regarding that traveler's journey through the second geographic zone 102 (for example, information regarding weather conditions, road conditions, hazards, and the like).

With momentary reference to FIG. 1, a traveler 117 moving in the second geographic zone 102 towards the first geographic zone 101 will enter the coverage range 109 of the transmitter 108 that is facilitating the process described above on behalf of the user 106 who is likely to leave the first geographic zone 101 and travel through the second geographic zone 102. Upon coming within this coverage area 109, this traveler 117, presuming this traveler 117 has a user platform 400 that is compatible with the communications service, can upload information as indicated to the database 202. Returning to FIG. 6, that information can then be retrieved from the database 202 and provided to the present user 106 as journey-related information to aid and assist the user 106 when traveling through the second geographic zone #102.

Upon obtaining 603 the indicated data from the one or more databases pursuant to one or more of the approaches set forth above, the user's platform 400 will store 604 the data in memory 402. In one embodiment, this memory may be, for example, a cache memory. Following storage 604 of the data, the process can conclude 605 and return to the main process as describe above with respect to FIG. 5.

So configured, a vehicle equipped with equipment to benefit from wireless services that provide journey-related information can continue to receive at least some benefit from information at least similar in appearance and kind when traveling in areas that do not benefit from an installed infrastructure base compatible with the information service. Various options and alternatives have been presented to facilitate accommodating a variety of needs and limitations as may apply in a given instance. Through use of the preferred embodiments, a gradual infrastructure rollout can be implemented without necessarily severely impacting users who come upon areas without infrastructure or coverage.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A process comprising:
   determining by a user platform in a vehicle that includes a user that the user, while in a first geographic zone, which first geographic zone has a first communications service that supports provision of a journey-related information to the user, is at least likely to leave the first geographic zone and enter a second geographic zone, which second geographic zone does not have the first communications service;
   downloading to the user platform, in response to the determination, at least some journey-related information regarding the second geographic zone while the user is at least proximal to an entrance boundary for the second geographic zone.

2. The process of claim 1 wherein downloading comprises downloading from a database to the user.

3. The process of claim 2 wherein downloading from a database to the user at least some journey related information regarding the second geographic zone includes downloading all journey-related information regarding the second geographic zone as is contained in the database.

4. The process of claim 2 wherein downloading from a database to the user at least some journey related information regarding the second geographic zone includes downloading only a portion of the journey-related information regarding the second geographic zone as is contained in the database.

5. The process of claim 4 wherein downloading only a portion of the journey related information regarding the second geographic zone as is contained in the database includes providing information that corresponds to an anticipated journey path for the user.

6. The process of claim 5 and further including determining the anticipated journey path for the user.

7. The process of claim 6 wherein determining the anticipated journey path for the user includes accessing destination point information as previously provided by the user.

8. The process of claim 6 wherein determining the anticipated journey path for the user includes estimating the anticipated journey path by referencing historical information regarding the user's travels.

9. The process of claim 4 wherein downloading only a portion of the journey related information regarding the second geographic zone as is contained in the database includes downloading only a portion of the journey related information regarding the second geographic zone as dynamically selected for the user.

10. The process of claim 9 wherein downloading only a portion of the journey related information regarding the second geographic zone as dynamically selected for the user includes downloading only a portion of the journey related information regarding the second geographic zone as dynamically selected by the user at the time of facilitating the downloading.

11. The process of claim 9 wherein downloading only a portion of the journey related information regarding the second geographic zone as dynamically selected for the user includes downloading only a portion of the journey related information regarding the second geographic zone as dynamically selected for the user based upon previously stored preferences that are at least partially specific to the user.

12. The process of claim 11 wherein downloading includes receiving the previously stored preferences from the user.

13. The process of claim 11 wherein downloading includes receiving the previously stored preferences from a database that is remote from the user.

14. The process of claim 11 wherein downloading includes receiving part of the previously stored preferences from the user and part of the previously stored preferences from a database that is remote from the user.

15. The process of claim 4 wherein downloading only a portion of the journey related information regarding the second geographic zone as is contained in the database includes downloading at least weather forecast information for at least a part of the second geographic zone.

16. The process of claim 15 wherein downloading at least weather forecast information for at least a part of the second geographic zone includes downloading at least weather forecast information that corresponds to an anticipated journey path for the user.

17. The process of claim 1 wherein downloading comprises wirelessly downloading to the user at least a portion of journey-related information regarding the second geographic zone while the user is at least proximal to an entrance boundary for the second geographic zone.

18. The process of claim 17 wherein wirelessly downloading includes wirelessly downloading to the user a complete payload of journey-related information regarding the second geographic zone while the user is at least proximal to an entrance boundary for the second geographic zone.

19. The process of claim 17 wherein downloading further comprises completing the downloading to the user of all remaining journey-related information regarding the second geographic zone while the user is within the second geographic zone and distal to the entrance boundary.

20. The process of claim 19 wherein completing the downloading includes completing the downloading using a second communications service, which second communications service is different from the first communications service.

21. The process of claim 20 wherein completing the downloading using a second communications service includes completing the downloading using a second communications service comprising a cellular telephony system.

22. The process of claim 1 wherein downloading comprises downloading to the user at least a portion of journey-related information regarding the second geographic zone while the user is at least proximal to an entrance boundary for the second geographic zone using a physical interconnection.

23. The process of claim 22 wherein using a physical interconnection includes using a portable memory device.

24. The process of claim 23 wherein using a portable memory device includes using an optically encoded memory device.

25. The process of claim 23 wherein using a portable memory device includes using an electro-magnetically encoded memory device.

26. The process of claim 23 wherein using a portable memory device includes dispensing the portable memory device to the user from a dispensing station.

27. The process of claim 26 wherein dispensing the portable memory device to the user from a dispensing station includes dynamically placing at least part of the journey-related information in the portable memory device for the user.

28. The process of claim 22 wherein using a physical interconnection includes using a data conduit.

29. The process of claim 28 wherein using a data conduit includes using an optical conduit.

30. The process of claim 28 wherein using a data conduit includes using an electrical signal conduit.

31. The process of claim 1 and further comprising storing the journey-related information regarding the second geographic zone in a memory.

32. The process of claim 31 wherein storing the journey-related information regarding the second geographic zone in a memory includes storing the journey-related information regarding the second geographic zone in a cache memory.

33. The process of claim 31 and further comprising automatically removing at least portions of the journey-related information regarding the second geographic zone as the user travels through the second geographic zone.

34. The process of claim 33 wherein automatically removing at least portions of the journey-related information regarding the second geographic zone as the user travels through the second geographic zone includes automatically removing portions of the journey-related information regarding the second geographic zone that correspond to geographic locations that the user has at least reached.

35. The process of claim 33 wherein:
downloading includes downloading to the user at least some journey-related information regarding the second geographic zone wherein at least some of the journey-related information includes a corresponding data-expiration time; and
automatically removing at least portions of the journey-related information regarding the second geographic zone as the user travels through the second geographic zone includes automatically removing portions of the journey-related information regarding the second geographic zone for which the data-expiration time has expired.

36. The process of claim 1 wherein downloading comprises downloading to the user pursuant to user-based downloading criteria.

37. The process of claim 36 wherein downloading to the user pursuant to user-based downloading criteria includes downloading to the user pursuant to user-based downloading criteria that includes encryption information.

38. The process of claim 37 and wherein downloading to the user pursuant to user-based downloading criteria that includes encryption information includes downloading to the user pursuant to user-based downloading criteria that includes encryption information comprising an encryption key.

39. The process of claim 36 wherein downloading to the user pursuant to the user-based downloading criteria includes downloading to the user pursuant to user-based downloading criteria that includes at least one data format specification.

40. The process of claim 36 wherein downloading to the user pursuant to the user-based downloading criteria includes downloading to the user pursuant to user-based downloading criteria that includes data compression information.

41. The process of claim 40 wherein downloading to the user pursuant to user-based downloading criteria that includes data compression information includes downloading to the user pursuant to user-based downloading criteria that includes data compression information comprising a specific type of data compression.

42. The process of claim 36 wherein downloading to the user pursuant to the user-based downloading criteria includes downloading to the user pursuant to user-based downloading criteria that includes at least one data presentation specification.

43. The process of claim 42 wherein downloading to the user pursuant to user-based downloading criteria that includes at least one data presentation specification includes downloading to the user pursuant to user-based downloading criteria that includes at least one data presentation specification specifying at least one visual display of information.

44. The process of claim 43 wherein downloading to the user pursuant to user-based downloading criteria that includes at least one data presentation specification specifying at least one visual display of information includes downloading to the user pursuant to user-based downloading criteria that includes at least one data presentation specification specifying at least one textual display of information.

45. The process of claim 43 wherein downloading to the user pursuant to user-based downloading criteria that includes at least one data presentation specification specifying at least one visual display of information includes downloading to the user pursuant to user-based downloading criteria that includes at least one data presentation specification specifying at least one graphic display of information.

46. The process of claim 42 and wherein downloading to the user pursuant to user-based downloading criteria that includes at least one data presentation specification includes downloading to the user pursuant to user-based downloading criteria that includes at least one data presentation specification specifying at least one audible conveyance of information.

47. The process of claim 36 wherein downloading to the user pursuant to user-based downloading criteria includes compressing information to be transmitted to the user as a function, at least in part, of at least one of the user's processing speed, memory size, and vehicle speed.

48. A process comprising:
  determining by a user platform in a vehicle that includes a user that the user, while in a first geographic zone, which first geographic zone has a first communications service that supports provision of a journey-related information to the user, is at least likely to leave the first geographic zone and enter a second geographic zone, which second geographic zone does not have the first communications service;
  downloading to the user platform, in response to the determination, at least some journey-related information regarding the second geographic zone while the user is at least proximal to an entrance boundary for the second geographic zone,
  wherein downloading to the user at least some journey-related information regarding the second geographic zone while the user is at least proximal to an entrance boundary for the second geographic zone includes downloading to the user at least some journey-related information regarding the second geographic zone that has been obtained from other travelers journeying from the second geographic zone.

49. The process of claim 1 wherein determining that a user in a first geographic zone is at least likely to leave the first geographic zone and enter a second geographic zone includes detecting that the user has previously passed at least one predetermined geographic location.

50. The process of claim 49 wherein detecting that the user has previously passed at least one predetermined geographic location includes detecting that the user has previously passed at least two predetermined geographic locations.

51. The process of claim 49 wherein detecting that the user has previously passed at least one predetermined geographic location includes detecting that the user has previously passed the at least one predetermined geographic location within a predetermined period of time.

52. The process of claim 49 wherein detecting that the user has previously passed at least one predetermined geographic location includes automatically accessing a navigation device as used by the user.

53. The process of claim 52 wherein accessing a navigation device as used by the user includes automatically accessing a global positioning system navigation device as used by the user.

54. The process of claim 52 wherein accessing a navigation device as used by the user includes automatically accessing a dead reckoning navigation device as used by the user.

55. The process of claim 1 and further comprising uploading at least some user information.

56. The process of claim 55 wherein up-loading at least some user information includes uploading at least an intended destination for the user.

57. The process of claim 55 wherein up-loading at least some user information includes uploading at least an estimated time at when the user enters the second geographic zone.

58. The process of claim 55 wherein up-loading at least some user information includes uploading at least an intended travel route for the user.

59. The process of claim 55 wherein up-loading at least some user information includes uploading at least a wireless telephonic contact number for the user.

60. An apparatus comprising:
  determining means for determining that a user in a first geographic zone, which first geographic zone has a first communications service that supports provision of a journey-related information to the user, is at least likely to leave the first geographic zone and enter a second geographic zone, which second geographic zone does not have the first communications service; and
  downloading means for downloading to the apparatus, in response to the determination, at least some journey-related information regarding the second geographic zone while the user is at least proximal to an entrance boundary for the second geographic zone.

61. The apparatus of claim 60 wherein the downloading means includes means for downloading the at least some journey-related information from a database to the user.

62. The apparatus of claim 60 wherein the downloading means includes means for wirelessly downloading to the user at least a portion of journey-related information regarding the second geographic zone while the user is at least proximal to an entrance boundary for the second geographic zone.

63. The apparatus of claim 60 wherein the downloading means includes physical connection means for downloading to the user at least a portion of the journey-related information regarding the second geographic zone while the user is at least proximal to an entrance boundary for the second geographic zone.

64. The apparatus of claim 63 wherein the physical connection means includes portable memory means for retaining at least some of the information.

65. The apparatus of claim 64 wherein the portable memory means includes at least an optically encoded memory device.

66. The apparatus of claim 64 wherein the portable memory means includes at least an electromagnetically encoded memory device.

67. The apparatus of claim 63 wherein the physical connection means includes a data conduit.

68. The apparatus of claim 60 wherein the downloading means includes means for downloading the journey-related information to the user pursuant to user-based downloading criteria.

69. The apparatus of claim 68 wherein the user-based downloading criteria includes at least one of encryption information, data format specifications, data compression specifications, and data presentation specifications.

70. The apparatus of claim 60 and further comprising memory means operably coupled to the means for downloading for storing at least a part of the journey-related information regarding the second geographic zone.

71. A method to provide a terrestrial-based vehicle user, which user uses wirelessly transmitted journey-related information by means of a user platform when traveling through a first geographic zone having at least short-range roadside transmitters that transmit journey-related information compatibly with an information service, with journey-related information regarding a second geographic zone that has at least a considerably reduced number of the short-range roadside transmitters that are operable, comprising the steps of:
  determining by the user platform that the user is at least likely in the near future to enter the second geographic zone;
  downloading to the user platform, in response to the determination, at least some journey-related information regarding the second geographic zone while the user is at least proximal to an entrance boundary for the second geographic zone to provide downloaded journey-related information;
  using at least some of the downloaded journey-related information while traveling through the second geographic zone.

* * * * *